(12) United States Patent
Yamaguchi

(10) Patent No.: US 9,206,321 B2
(45) Date of Patent: Dec. 8, 2015

(54) TRIVALENT CHROMIUM-CONVERSION PROCESSING SOLUTION CONTAINING ALUMINUM-MODIFIED COLLOIDAL SILICA

(71) Applicant: DIPSOL CHEMICALS CO., LTD., Tokyo (JP)

(72) Inventor: Shinji Yamaguchi, Chiba (JP)

(73) Assignee: DIPSOL CHEMICALS CO., LTD., Tokyo (JP)

( * ) Notice: Subject to any disclaimer, the term of this patent is extended or adjusted under 35 U.S.C. 154(b) by 0 days.

(21) Appl. No.: 14/403,857

(22) PCT Filed: Jun. 4, 2013

(86) PCT No.: PCT/JP2013/065491
§ 371 (c)(1),
(2) Date: Nov. 25, 2014

(87) PCT Pub. No.: WO2013/183644
PCT Pub. Date: Dec. 12, 2013

(65) Prior Publication Data
US 2015/0135988 A1    May 21, 2015

(30) Foreign Application Priority Data
Jun. 4, 2012  (JP) .................... 2012-127123

(51) Int. Cl.
| C23C 22/53 | (2006.01) |
| C23C 22/30 | (2006.01) |
| C09D 5/08 | (2006.01) |
| C08K 3/08 | (2006.01) |
| C08K 3/36 | (2006.01) |

(52) U.S. Cl.
CPC ... *C09D 5/08* (2013.01); *C08K 3/08* (2013.01); *C08K 3/36* (2013.01); *C23C 22/53* (2013.01); *C23C 2222/10* (2013.01)

(58) Field of Classification Search
CPC ............................. C23C 22/53; C23C 2222/10

USPC .................... 106/14.05, 14.21; 148/243, 264; 428/457, 469
See application file for complete search history.

(56) References Cited

U.S. PATENT DOCUMENTS

| 3,421,949 A | * | 1/1969 | Halversen ...................... 148/245 |
| 3,506,499 A | * | 4/1970 | Okada et al. .................. 428/472 |
| 5,449,414 A | * | 9/1995 | Dolan ............................ 148/247 |
| 5,938,861 A | * | 8/1999 | Inoue et al. .................... 148/247 |
| 6,287,704 B1 | | 9/2001 | Preikschat et al. |
| 6,946,201 B2 | | 9/2005 | Preikschat et al. |
| 2003/0207133 A1 | | 11/2003 | Preikschat et al. |
| 2013/0177709 A1 | * | 7/2013 | Ishikawa et al. ........... 427/385.5 |

FOREIGN PATENT DOCUMENTS

| JP | S-63157878 | 6/1988 | |
| JP | H-06199515 | 7/1994 | |
| JP | 2000-509434 | 7/2000 | |
| JP | 2001-335958 | 12/2001 | |
| JP | 2003-073851 | 3/2003 | |
| JP | 2004-003019 | 1/2004 | |
| JP | 2004-346360 A | * 12/2004 | .............. C23C 28/00 |
| JP | 2005-126797 | 5/2005 | |
| JP | 2007-277025 | 10/2007 | |
| WO | WO-2008/111383 | 9/2008 | |

OTHER PUBLICATIONS

Machine Translation of Japanese Patent Specification No. JP 06-199515 (Jul. 1994).*
Machine Translation of Japanese Patent Specification No. JP 2003-073851 (Mar. 2003).*
Machine Translation of Japanese Patent Specification No. JP 2005-126797 (May 2005).*
International Search Report for International Application No. PCT/JP2013/065491 mailed Jul. 9, 2013 (including English translation).

* cited by examiner

*Primary Examiner* — Anthony J Green
(74) *Attorney, Agent, or Firm* — Foley & Lardner LLP; James F. Ewing

(57) ABSTRACT

The present invention provides a trivalent chromium-conversion processing solution characterized by containing aluminum-modified colloidal silica.

4 Claims, No Drawings

TRIVALENT CHROMIUM-CONVERSION PROCESSING SOLUTION CONTAINING ALUMINUM-MODIFIED COLLOIDAL SILICA

CROSS-REFERENCE TO RELATED APPLICATIONS

This application is a U.S. national stage filing under 35 U.S.C. §371 of International Application No. PCT/JP2013/065491, filed Jun. 4, 2013, which claims priority to Japanese Patent Application No. JP 2012-127123, file on Jun. 4, 2012, both of which are hereby incorporated by reference in their entirety.

TECHNICAL FIELD

The present invention relates to a trivalent chromium chemical conversion processing solution for forming a corrosion resistant trivalent chromium chemical conversion coating film on a metal surface, especially on zinc or zinc alloy plating, as well as a method for forming a trivalent chromium chemical conversion coating film on zinc or zinc alloy plating by using the trivalent chromium chemical conversion processing solution and a trivalent chromium chemical conversion coating film formed on zinc or zinc alloy plating by using the trivalent chromium chemical conversion processing solution.

BACKGROUND ART

Methods for preventing corrosion of a metal surface include a zinc or zinc alloy plating method and the like. The corrosion resistance achieved by the plating alone is insufficient. Hence, a post-plating treatment with chromic acid containing hexavalent chromium, so called the chromate treatment, is widely employed in the industrial field. However, it has been pointed out recently that hexavalent chromium has adverse effects on the human body and the environment, and the use of hexavalent chromium has been restricted. An alternative technology is a corrosion inhibition coating film using trivalent chromium. For example, Japanese Patent Application Publications Nos. 2000-509434 and 2004-003019 disclose a treatment method using a processing solution comprising a trivalent chromium salt, nitrate ions, an organic acid, and a salt of a metal such as cobalt. Meanwhile, Japanese Patent Application Publications Nos. 2001-335958 and 2005-126797 disclose a treatment method using a trivalent chromium chemical conversion processing agent for zinc alloy plating, the agent comprising a trivalent chromium salt, nitrate ions, an organic acid, and a salt of a metal such as cobalt.

SUMMARY OF INVENTION

Conventionally, as a trivalent chromium chemical conversion processing agent used for a surface treatment for preventing corrosion of metal, a trivalent chromium chemical conversion processing agent comprising a colloidal silica for the purposes of corrosion resistance improvement and the like is used in some cases. However, when a colloidal silica-containing trivalent chromium chemical conversion coating film is formed on zinc or zinc alloy plating by using a colloidal silica-containing trivalent chromium chemical conversion processing solution, a haze-like white non-glossy appearance may be imparted non-uniformly on the zinc plating or the zinc alloy plating in some cases such as a case where the chemical conversion processing is conducted by using a stainless steel barrel basket or the like, for example. In this respect, an improvement has been desired. An object of the present invention is to provide a colloidal silica-containing trivalent chromium chemical conversion processing solution which does not allow formation of the haze-like white non-glossy appearance seen in the conventional trivalent chromium chemical conversion processing using a colloidal silica.

The present inventors have conducted intensive study to find that the above-described problem can be solved by using a trivalent chromium chemical conversion processing solution comprising an aluminum-modified colloidal silica. Specifically, the present invention provides a trivalent chromium chemical conversion processing solution comprising an aluminum-modified colloidal silica.

The present invention also provides a trivalent chromium chemical conversion coating film obtained by bringing a metal surface, preferably zinc or zinc alloy plating into contact with the above-described trivalent chromium chemical conversion processing solution.

The present invention makes it possible to obtain a trivalent chromium chemical conversion coating film having a better appearance free from any haze-like white non-glossy appearance portion on a metal surface, preferably on zinc or zinc alloy plating, than a conventional colloidal silica-containing trivalent chromium chemical conversion coating film.

DESCRIPTION OF EMBODIMENTS

A trivalent chromium chemical conversion processing solution of the present invention comprises an aluminum-modified colloidal silica at preferably 2 to 100 g/L, more preferably 3 to 80 g/L, and particularly preferably 5 to 50 g/L.

A metal surface treated with the trivalent chromium chemical conversion processing solution of the present invention is not particularly limited, and may be a surface of zinc, a zinc alloy, an iron alloy, aluminum, an aluminum alloy, nickel, a nickel alloy, or the like. The metal surface is preferably a surface of zinc or a zinc alloy. Such surfaces of zinc or a zinc alloy include those obtained by conducting zinc or zinc alloy plating on substrates which are made of various metals such as iron, nickel, and copper, alloys thereof, aluminum subjected to a zincate treatment, and the like and which are formed into various shapes such as a plate-like shape, a cuboid shape, a circular cylindrical shape, a cylindrical tubular shape, and a spherical shape. A plating bath used for depositing the zinc or zinc alloy plating on the substrate is not particularly limited, and it is possible to use any one of acidic baths such as a sulfuric acid bath, an ammonium bath, and a potassium bath and alkaline baths such as an alkaline and cyanide-free bath and an alkaline and cyanide-containing bath. The thickness of the zinc or zinc alloy plating deposited on the substrate may be any, and is preferably 1 μm or more, and more preferably 5 to 25 μm. The zinc alloy plating may be zinc-iron alloy (Zn—Fe) plating, zinc-nickel alloy (Zn—Ni) plating with a nickel co-deposition ratio of 5 to 20%, zinc-cobalt alloy (Zn—Co) plating, tin-zinc alloy (Sn—Zn) plating, or the like. The zinc alloy plating is preferably Zn—Fe plating (Fe content: 0.4 to 2% by weight), Zn—Ni plating (Ni content: 5 to 18% by weight), or Sn—Zn plating (Zn content: 5 to 60% by weight). After the zinc or zinc alloy plating is deposited on the substrate, the plated substrate is, for example, washed with water, and then subjected to an immersion treatment in an aqueous solution containing low-concentration trivalent chromium, an organic acid such as oxalic acid or malonic acid, a cobalt salt, and inorganic acid ions (for example, hydrochloric acid, sulfuric acid, nitric acid, phosphoric acid, or a salt thereof).

The trivalent chromium chemical conversion processing solution into which the aluminum-modified colloidal silica is introduced is not particularly limited, and a known trivalent chromium chemical conversion processing solution can be used. As the source of the trivalent chromium ions contained in the trivalent chromium chemical conversion processing solution of the present invention, any chromium compound containing trivalent chromium ions can be used, and it is preferable to use a trivalent chromium salt such as chromium chloride, chromium sulfate, chromium nitrate, chromium phosphate, or chromium acetate. It is possible to use one of or a combination of two or more of the above-described sources of trivalent chromium. The concentration of the trivalent chromium in the processing solution is not limited in terms of the performance, and is preferably made as low as possible from the viewpoint of wastewater treatment. Accordingly, considering the corrosion resistance performance and the like together, the concentration of the trivalent chromium ions in the processing solution is preferably in a range from 0.5 to 20 g/L, more preferably in a range from 0.2 to 5 g/L, and further preferably in a range from 1 to 5 g/L. In the present invention, setting the concentration of the trivalent chromium ions within such a range is advantageous from the viewpoint of wastewater treatment and also in terms of economy. Note that the trivalent chromium chemical conversion processing solution of the present invention is, in general, a trivalent chromium chemical conversion processing solution for forming a coating film called a hexavalent chromium-free trivalent chromium coating film.

The trivalent chromium chemical conversion processing solution of the present invention may further comprise inorganic acid ions. Sources of the inorganic acid ions include hydrochloric acid, nitric acid, sulfuric acid, salts thereof, and the like. One of the inorganic acids or a combination of two or more thereof may be used. The concentration of the inorganic acid ions in the processing solution is preferably in a range from 1 to 50 g/L and more preferably in a range from 1 to 20 g/L.

The trivalent chromium chemical conversion processing solution of the present invention does not necessarily have to contain any chelating agent. However, inclusion of a chelating agent is preferable, because a more uniform chemical conversion coating can be obtained. The chelating agent may be an organic carboxylic acid having chelate formation ability, a salt thereof, or the like. In addition, among organic carboxylic acids, preferred are dicarboxylic acids such as oxalic acid, malonic acid, succinic acid, citric acid, and adipic acid; oxycarboxylic acids such as citric acid, tartaric acid, and malic acid; and polycarboxylic acids such as tricarballylic acid. These organic carboxylic acids may be in the form of salts (for example, salts of sodium, potassium, ammonium, and the like). One of the above-described chelating agents or a combination of two or more thereof may be used. The concentration of the chelating agent in the processing solution is preferably in a range from 1 to 40 g/L and more preferably in a range from 2 to 10 g/L.

The trivalent chromium chemical conversion processing solution of the present invention may further comprise ions of a metal selected from the group consisting of Co, V, Ti, W, Zr, Mn, Mo, Ta, Ce, Sr, Fe, and Al. The sources of these metal ions include chlorides, nitric acid salts, sulfuric acid salts, acetic acid salts, oxoacid salts, and the like of the metal ions. One species of the above-described metal ions or a combination of two or more species thereof can be used. The concentration of the metal ions in the processing solution is preferably in a range from 0.1 to 5 g/L and more preferably in a range from 0.5 to 3 g/L.

Besides the above-described components, it is possible to add one or more selected from phosphorus oxoacids such as phosphoric acid and phosphorous acid; alkali salts thereof; and the like. In this case, the concentration in the processing solution is preferably 0.1 to 50 g/L and more preferably 0.5 to 20 g/L.

In a preferred embodiment, the trivalent chromium chemical conversion processing solution of the present invention comprises: trivalent chromium ions at a concentration of 0.5 to 20 g/L; inorganic acid ions at 1 to 50 g/L; an organic carboxylic acid or a salt thereof at 1 to 40 g/L; and ions of a metal selected from the group consisting of Co, V, Ti, W, Zr, Mn, Mo, Ta, Ce, Sr, Fe, and Al at 0.1 to 5 g/L.

The aluminum-modified colloidal silica contained in the trivalent chromium chemical conversion processing solution of the present invention means an aluminate-modified colloidal silica obtained by treating a colloidal silica with an aqueous aluminate salt solution (for example, an aqueous solution containing an alkali aluminate salt such as sodium aluminate or the like) or an aqueous solution of a hydroxyl group-containing organic acid aluminum salt (for example, an aqueous solution containing aluminum lactate or the like). Methods for producing such an aluminum-modified colloidal silica are described in, for example, Japanese Patent Application Publication No. Hei 6-199515, WO2008/111383A1, Japanese Patent Application Publication No. 2007-277025, etc. The $Al_2O_3/SiO_2$ mole ratio of the aluminum-modified colloidal silica used in the present invention is preferably in a range from 0.0001 to 0.05, more preferably in a range from 0.001 to 0.04, and particularly preferably in a range from 0.002 to 0.03. In addition, the primary particle diameter of the aluminum-modified silica is preferably in a range from 1 to 100 nm, more preferably in a range from 2 to 50 nm, and particularly preferably in a range from 3 to 30 nm. Such an aluminum-modified colloidal silica is available as a commercial product (for example, LUDOX AM manufactured by DuPont USA, SNOWTEX CXS and SNOWTEX C manufactured by Nissan Chemical Industries, Ltd., SILICADOL 20AL manufactured by NIPPON CHEMICAL INDUSTRIAL CO., LTD, and the like).

The form of the aluminum-modified colloidal silica at the addition to the trivalent chromium chemical conversion processing solution is preferably an alkaline dispersion in which an aluminum-modified colloidal silica in an amorphous and particulate form is dispersed in water with the solid content thereof being in a range from approximately 10 to 50% by weight. The pH is preferably in a range from 2 to 12, more preferably in a range from 7 to 12, and particularly preferably in a range from 8 to 11. The aluminum-modified colloidal silica does not aggregate or deposit in an acidic trivalent chromium chemical conversion processing solution or an aqueous solution with a pH of 2 to 12. The use of such an aluminum-modified colloidal silica makes it possible to obtain a trivalent chromium chemical conversion processing solution which does not allow the non-uniform formation of a haze-like white non-glossy appearance. Although a detailed reason is unclear, this is presumably because the colloidal silica is uniformly dispersed and deposited in the formed chemical conversion coating film.

A method for adding the aluminum-modified colloidal silica to the trivalent chromium chemical conversion processing solution is not particularly limited, and any known adding and mixing method can be used. For example, the aluminum-modified colloidal silica may be added simultaneously with the mixing and stirring of the various additive at normal temperature to prepare the chemical conversion processing solution.

The pH of the trivalent chromium chemical conversion processing solution containing the aluminum-modified colloidal silica of the present invention is preferably 1 to 5, and more preferably 2 to 4. For the adjustment of the pH, any of the above-described inorganic acids may be used, or an alkali agent such as an alkali hydroxide or ammonia water may be used. The balance of the trivalent chromium chemical conversion processing solution containing the aluminum-modified colloidal silica of the present invention other than the above-described components is water.

For example, by bringing a metal surface such as zinc or zinc alloy plating into contact with the above-described trivalent chromium chemical conversion processing solution, a hexavalent chromium-free trivalent chromium chemical conversion coating film can be formed on the zinc or zinc alloy plating. A common method for bringing the metal surface such as zinc or zinc alloy plating into contact with the trivalent chromium chemical conversion processing solution is, for example, that a substrate plated with zinc or zinc alloy is immersed in the above-described trivalent chromium chemical conversion processing solution. For example, it is preferable to immerse the substrate at a liquid temperature of 10 to 40° C. for 5 to 600 seconds and more preferably for 15 to 120 seconds. Note that, in the case of zinc plating, a workpiece is immersed in a dilute nitric acid solution before the trivalent chromium chemical conversion processing, in general, in order to increase the gloss of the trivalent chromium chemical conversion coating film. In the present invention, such a pretreatment may be employed, but does not necessarily have to be employed. Conditions and treatment operations other than the above-described ones may be the same as those of conventional chromate treatment methods.

Next, the present invention is described based on Examples and Comparative Examples.

EXAMPLES

Example 1

Bolts subjected to zincate-zinc plating having a thickness of 8 μm using an NZ-100 bath manufactured by DIPSOL CHEMICALS Co., Ltd. were immersed in a trivalent chromium chemical conversion processing solution shown below (the bolts were stirred in a stainless steel basket). The processing temperature was 35° C., and the processing time was 40 seconds.

The trivalent chromium chemical conversion processing solution was prepared by adding LUDOX AM manufactured by DuPont USA as a colloidal silica in an amount of 30 g/L to 70 mL/L of ZT-444CS manufactured by DIPSOL CHEMICALS Co., Ltd. The pH of the processing solution was adjusted to 2.7 by using NaOH.

Example 2

Bolts subjected to zincate-zinc plating having a thickness of 8 μm using an NZ-110 bath manufactured by DIPSOL CHEMICALS Co., Ltd. were immersed in a trivalent chromium chemical conversion processing solution shown below (the bolts were stirred in a stainless steel basket). The processing temperature was 30° C., and the processing time was 25 seconds.

The trivalent chromium chemical conversion processing solution was prepared by adding SNOWTEX CXS manufactured by Nissan Chemical Industries, Ltd. as a colloidal silica in an amount of 20 g/L to 100 mL/L of ZT-444A manufactured by DIPSOL CHEMICALS Co., Ltd. The pH of the processing solution was adjusted to 3.0 by using NaOH.

Example 3

Bolts subjected to zincate-zinc plating having a thickness of 8 μm using an NZ-200 bath manufactured by DIPSOL CHEMICALS Co., Ltd. were immersed in a trivalent chromium chemical conversion processing solution shown below (the bolts were stirred in a stainless steel basket). The processing temperature was 30° C., and the processing time was 40 seconds.

The trivalent chromium chemical conversion processing solution was prepared by adding SILICADOL 20AL manufactured by NIPPON CHEMICAL INDUSTRIAL CO., LTD. as a colloidal silica in an amount of 20 g/L to 75 mL/L of ZT-444DSM1 manufactured by DIPSOL CHEMICALS Co., Ltd. The pH of the processing solution was adjusted to 2.5 by using NaOH.

Example 4

Bolts subjected to Zn—Fe plating (Fe content: 0.4% by weight) having a thickness of 8 μm using an FZ-272 bath manufactured by DIPSOL CHEMICALS Co., Ltd. were immersed in a trivalent chromium chemical conversion processing solution shown below (the bolts were stirred in a stainless steel basket). The processing temperature was 40° C., and the processing time was 30 seconds.

The trivalent chromium chemical conversion processing solution was prepared by adding SNOWTEX C manufactured by Nissan Chemical Industries, Ltd. as a colloidal silica in an amount of 10 g/L to 50 mL/L of ZT-444S manufactured by DIPSOL CHEMICALS Co., Ltd. The pH of the processing solution was adjusted to 2.3 by using NaOH.

Comparative Example 1

Bolts subjected to zincate-zinc plating having a thickness of 8 μm using an NZ-100 bath manufactured by DIPSOL CHEMICALS Co., Ltd. were immersed in a trivalent chromium chemical conversion processing solution shown below (the bolts were stirred in a stainless steel basket). The processing temperature was 35° C., and the processing time was 40 seconds.

The trivalent chromium chemical conversion processing solution was prepared by adding LUDOX HS-30 manufactured by DuPont USA as a colloidal silica in an amount of 30 g/L to 70 mL/L of ZT-444CS manufactured by DIPSOL CHEMICALS Co., Ltd. The pH of the processing solution was adjusted to 2.7 by using NaOH.

Comparative Example 2

Bolts subjected to zincate-zinc plating having a thickness of 8 μm using an NZ-110 bath manufactured by DIPSOL CHEMICALS Co., Ltd. were immersed in a trivalent chromium chemical conversion processing solution shown below (the bolts were stirred in a stainless steel basket). The processing temperature was 30° C., and the processing time was 25 seconds.

The trivalent chromium chemical conversion processing solution was prepared by adding SNOWTEX 20 manufactured by Nissan Chemical Industries, Ltd. as a colloidal silica in an amount of 20 g/L to 100 mL/L of ZT-444A manufactured by DIPSOL CHEMICALS Co., Ltd. The pH of the processing solution was adjusted to 3.0 by using NaOH.

Comparative Example 3

Bolts subjected to zincate-zinc plating having a thickness of 8 μm using an NZ-200 bath manufactured by DIPSOL CHEMICALS Co., Ltd. were immersed in a trivalent chromium chemical conversion processing solution shown below (the bolts were stirred in a stainless steel basket). The processing temperature was 30° C., and the processing time was 40 seconds.

The trivalent chromium chemical conversion processing solution was prepared by adding SILICADOL 20 manufactured by NIPPON CHEMICAL INDUSTRIAL CO., LTD as a colloidal silica in an amount of 20 g/L to 75 mL/L of ZT-444DSM1 manufactured by DIPSOL CHEMICALS Co., Ltd. The pH of the processing solution was adjusted to 2.5 by using NaOH.

Comparative Example 4

Bolts subjected to Zn—Fe plating (Fe content: 0.4% by weight) having a thickness of 8 μm using an FZ-272 bath manufactured by DIPSOL CHEMICALS Co., Ltd. were immersed in a trivalent chromium chemical conversion processing solution shown below (the bolts were stirred in a stainless steel basket). The processing temperature was 40° C., and the processing time was 30 seconds.

The trivalent chromium chemical conversion processing solution was prepared by adding SNOWTEX 0 manufactured by Nissan Chemical Industries, Ltd. as a colloidal silica in an amount of 10 g/L to 50 mL/L of ZT-444S manufactured by DIPSOL CHEMICALS Co., Ltd. The pH of the processing solution was adjusted to 2.3 with NaOH.

(Salt Spray Corrosion Resistance Test)

Regarding Examples 1 to 3 and Comparative Examples 1 to 3, the corrosion resistance was evaluated by a salt spray test (JIS-Z-2371). Table 1 shows the results.

TABLE 1

| Results of salt spray corrosion resistance test (JIS-Z-2371) | | |
|---|---|---|
| | Appearance of coating film | Corrosion resistance Time to (5%) formation of white rust (Hrs) |
| Example 1 | Uniform interference color | 168 or more |
| Example 2 | Uniform interference color | 168 or more |
| Example 3 | Uniform interference color | 168 or more |
| Example 4 | Uniform interference color | 168 or more |

TABLE 1-continued

| Results of salt spray corrosion resistance test (JIS-Z-2371) | | |
|---|---|---|
| | Appearance of coating film | Corrosion resistance Time to (5%) formation of white rust (Hrs) |
| Comp. Ex. 1 | Non-uniform interference color with haze-like white non-glossy portion | 168 or more |
| Comp. Ex. 2 | Non-uniform interference color with haze-like white non-glossy portion | 168 or more |
| Comp. Ex. 3 | Non-uniform interference color with haze-like white non-glossy portion | 168 or more |
| Comp. Ex. 4 | Non-uniform interference color with haze-like white non-glossy portion | 168 or more |

The invention claimed is:

1. A trivalent chromium chemical conversion processing solution consisting essentially of a trivalent chromium ion; an aluminum-modified colloidal silica; an inorganic acid ion; a chelating agent selected from the group consisting of organic carboxylic acids and salts thereof; a phosphorus oxoacid or a alkali salt thereof; an ion of a metal selected from the group consisting of Co, V, Ti, W, Zr, Mn, Mo, Ta, Ce, Sr, Fe, and Al; and water; and optionally a pH adjustment agent, wherein the aluminum-modified colloidal silica is present in the range from 2 to 100 g/L, the trivalent chromium ion is present in the range from 0.5 to 20 g/L, no hexavalent chromium ions are present, and the pH is in a range from 1 to 5.

2. The trivalent chromium chemical conversion processing solution according to claim 1, consisting of a trivalent chromium ion; an aluminum-modified colloidal silica; an inorganic acid ion; a chelating agent selected from the group consisting of organic carboxylic acids and salts thereof; a phosphorus oxoacid or a alkali salt thereof; and ion of a metal selected from the group consisting of Co, V, Ti, W, Zr, Mn, Mo, Ta, Ce, Sr, Fe, and Al; water; and optionally a pH adjustment agent.

3. The trivalent chromium chemical conversion processing solution according to claim 1, wherein an $Al_2O_3/SiO_2$ mole ratio of the aluminum-modified colloidal silica is in a range from 0.0001 to 0.05.

4. The trivalent chromium chemical conversion coating film obtained by bringing a metal surface into contact with the trivalent chromium chemical conversion processing solution according to claim 1.

* * * * *